(12) United States Patent
Fujioka

(10) Patent No.: US 11,938,620 B2
(45) Date of Patent: Mar. 26, 2024

(54) ROBOT CABLE-ASSEMBLY MANAGEMENT STRUCTURE

(71) Applicant: FANUC CORPORATION, Yamanashi (JP)

(72) Inventor: Naoki Fujioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/798,770

(22) PCT Filed: Mar. 23, 2021

(86) PCT No.: PCT/JP2021/011825
§ 371 (c)(1),
(2) Date: Aug. 10, 2022

(87) PCT Pub. No.: WO2021/193578
PCT Pub. Date: Sep. 30, 2021

(65) Prior Publication Data
US 2023/0088797 A1  Mar. 23, 2023

(30) Foreign Application Priority Data
Mar. 26, 2020  (JP) ................................. 2020-056256

(51) Int. Cl.
*B25J 19/00* (2006.01)
*B25J 17/02* (2006.01)

(52) U.S. Cl.
CPC ....... *B25J 17/0241* (2013.01); *B25J 19/0025* (2013.01)

(58) Field of Classification Search
CPC ................ B25J 19/0029; B25J 19/0025; B25J 17/0241; H02J 11/00; H02H 11/003; H02G 3/0462; H02G 3/32
See application file for complete search history.

(56) References Cited

U.S. PATENT DOCUMENTS 5,178,031 A * 1/1993 Orsi ........................ B25J 9/1025
901/14
7,147,062 B2 * 12/2006 Kolacz ................ H02G 11/003
239/289

(Continued)

FOREIGN PATENT DOCUMENTS

EP       2 431 141 A1   3/2012
JP     2012-061565 A    3/2012

(Continued)

OTHER PUBLICATIONS

International Search Report dated May 25, 2021 in corresponding International Application No. PCT/JP2021/011825; 5 pages (w/ partial Machine translation).

*Primary Examiner* — Gregory Robert Weber
(74) *Attorney, Agent, or Firm* — Maier & Maier, PLLC

(57) ABSTRACT

A robot cable-assembly management structure including a first fixing member that fixes, to a turning drum, a cable assembly extending beside the turning drum in a front-rear direction, and a second fixing member that fixes, to a side surface of the arm, the cable assembly extending to a front side of the first fixing member, at a position closer to a distal end of the arm than the second axis, where a movable portion of the cable assembly located between the first fixing member and the second fixing member is provided with a necessary length of allowance and is twisted in one direction, so that the movable portion is bent in a direction away from the side surface of the arm when the arm swings to a rear swing end is displaced toward the side surface of the arm as the arm swings toward a front swing end.

3 Claims, 17 Drawing Sheets

(56) References Cited

U.S. PATENT DOCUMENTS

| | | | |
|---|---|---|---|
| 9,233,475 B2* | 1/2016 | Kume | B25J 19/00 |
| 10,059,011 B2* | 8/2018 | Burlot | B25J 19/0025 |
| 10,093,024 B2* | 10/2018 | Inoue | B25J 19/0025 |
| 10,710,251 B2* | 7/2020 | Inoue | B25J 17/00 |
| 2006/0101937 A1* | 5/2006 | Salomonsson | H02G 11/00 |
| | | | 74/490.02 |
| 2006/0156852 A1* | 7/2006 | Haniya | B25J 9/102 |
| | | | 74/490.03 |
| 2012/0067157 A1 | 3/2012 | Suzuki et al. | |
| 2014/0083229 A1 | 3/2014 | Kume | |
| 2017/0282381 A1 | 10/2017 | Inoue et al. | |
| 2018/0009117 A1 | 1/2018 | Yamamoto et al. | |
| 2019/0381596 A1 | 12/2019 | Sakurai et al. | |
| 2020/0238508 A1 | 7/2020 | Inoue et al. | |
| 2020/0298427 A1 | 9/2020 | Inoue et al. | |
| 2021/0115907 A1* | 4/2021 | Hampton | G01G 3/00 |

FOREIGN PATENT DOCUMENTS

| | | |
|---|---|---|
| JP | 2014-065110 A | 4/2014 |
| JP | 5591894 B | 8/2014 |
| JP | 2016-132076 A | 7/2016 |
| JP | 2017-185580 A | 10/2017 |
| JP | 2018-122404 A | 8/2018 |
| JP | 2020-116686 A | 8/2020 |
| JP | 2020-151802 A | 9/2020 |

* cited by examiner

ROBOT CABLE-ASSEMBLY MANAGEMENT STRUCTURE

CROSS-REFERENCE TO RELATED APPLICATION(S)

This application is based upon and claims the benefit of priority from Japanese Patent Application No. 2020-056256 filed on Mar. 26, 2020, the entire contents of which are incorporated herein by reference.

TECHNICAL FIELD

The present disclosure relates to a robot cable-assembly management structure.

BACKGROUND

In a known cable-assembly management structure, a pipe member is provided between a base and a turning drum of a robot so as to extend along the rotation axis of the turning drum, and a cable assembly led from the inside of the base and out upward of the turning drum through the pipe member is fixed to each of the base, the turning drum, an upper arm, and a lower arm (for example, see Japanese Patent No. 5591894).

In Japanese Patent No. 5591894, the cable assembly is led out upward from the center of turning of the turning drum, is bent around a portion behind the center of turning of the turning drum and is fixed to the turning drum beside the lower part of the first arm. The cable assembly is then bent in the direction along the side surface of the first arm and is fixed to the side surface of the first arm.

The cable assembly, at the position where it is fixed to the turning drum, extends generally in the direction toward the rotation axis of the first arm. The cable assembly, also at the position where it is fixed to the first arm, extends generally in the direction toward the rotation axis of the first arm.

Hence, when the first arm swings with respect to the turning drum, the cable assembly is extended to the maximum at a swing angle position of the first arm where the fixing position on the turning drum and the fixing position on the first arm are located substantially on a straight line with the center of rotation of the first arm therebetween. Furthermore, whichever direction of forward or backward the first arm may swing about the rotation axis with respect to the turning drum from the above swing angle position, the two fixed positions are brought toward each other, and thus, a movable portion of the cable assembly between the two fixed positions is loosened.

SUMMARY

An aspect of the present disclosure provides a robot cable-assembly management structure for a robot including a base to be installed on an installation surface, a turning drum supported so as to be rotatable about a vertical first axis with respect to the base, and an arm supported so as to be swingable about a horizontal second axis with respect to the turning drum, the cable-assembly management structure wiring a cable assembly from the turning drum to the arm, the cable-assembly management structure including: a first fixing member that fixes, to the turning drum, a first intermediate portion of the cable assembly extending beside the turning drum in a front-rear direction of the turning drum, at a position between the base and a base end of the arm; and a second fixing member that fixes, to a side surface of the arm, a second intermediate portion of the cable assembly extending to a front side of the first fixing member, at a position closer to a distal end of the arm than the second axis, wherein a movable portion of the cable assembly located between the first fixing member and the second fixing member is provided with a necessary length of allowance for operation of the arm and is twisted in one direction, so that the movable portion is bent in a direction away from the side surface of the arm when the arm swings to a rear swing end and the movable portion is displaced toward the side surface of the arm as the arm swings toward a front swing end.

DETAILED DESCRIPTION OF THE EMBODIMENTS

Figure 1:
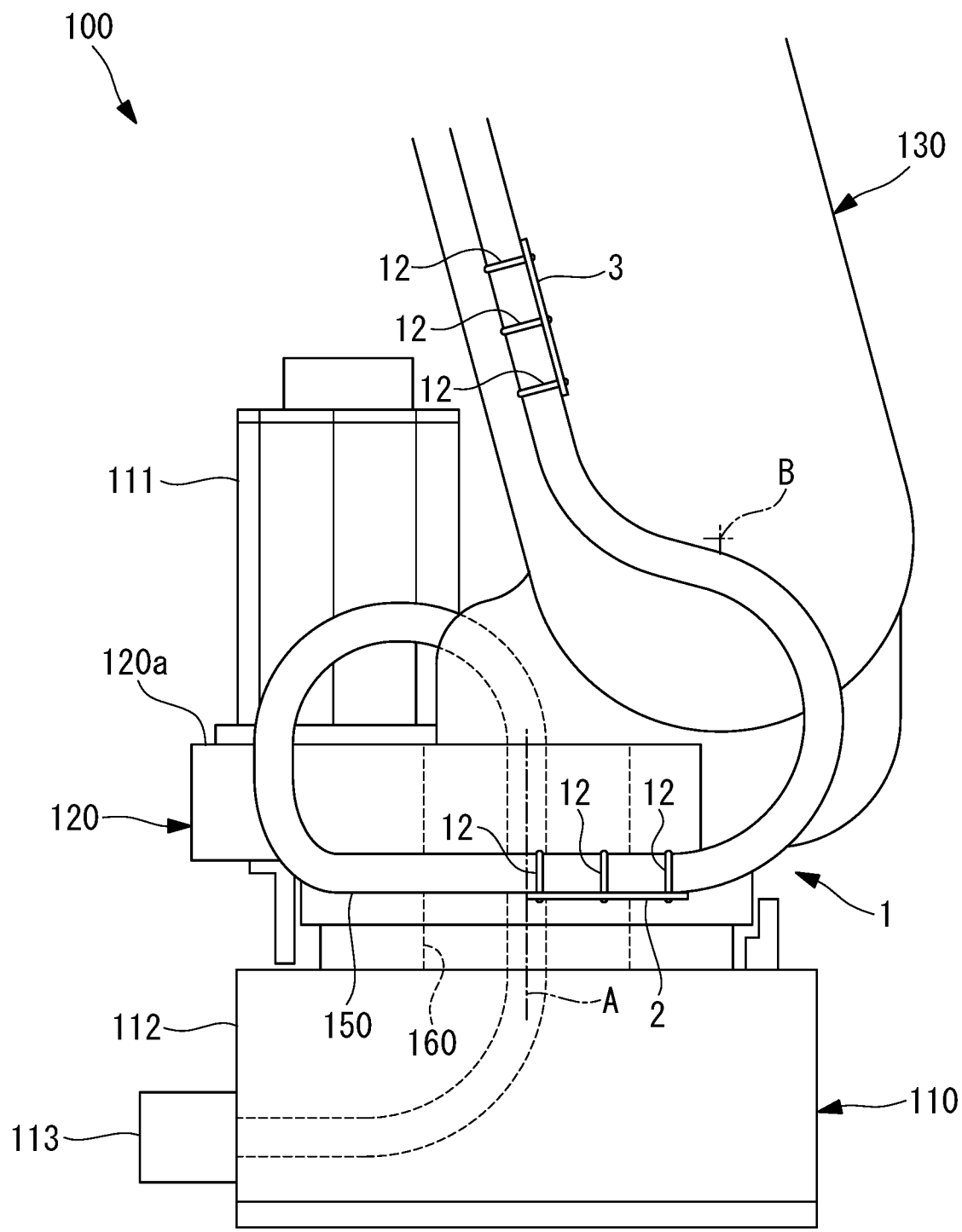
FIG. 1 is a partial side view of a robot showing a robot cable-assembly management structure according to an embodiment of the present disclosure.

In a conventional structure, whichever direction of forward or backward the first arm may swing from a swing angle position of the first arm at which the cable assembly is extended to the maximum, the movable portion of the cable assembly is loosened in the direction away from the center of rotation of the turning drum.

With a cable-assembly management structure, when wiring two cable assemblies in parallel, the two cable assemblies need to be arranged along the rotation axis of the first arm and need to be operated in the same way.

In this case, the two cable assemblies need to be arranged with a sufficient space therebetween in the direction of the rotation axis of the first arm, otherwise, the cable assemblies will touch and rub against each other when loosened simultaneously, reducing the life of the cable assemblies. Accordingly, it is desirable to prevent two cable assemblies from rubbing each other when arranged in parallel to prevent a reduction in the life of the cable assemblies.

A cable-assembly management structure 1 of a robot 100 according to an embodiment of the present disclosure will be described below with reference to the drawings.

As shown in FIGS. 1 to 7, the robot 100 to which the cable-assembly management structure 1 according to this embodiment is applied includes a base 110 to be installed on an installation surface, such as a floor, and a turning drum 120 supported so as to be rotatable about a vertical first axis A with respect to the base 110.

The robot 100 also includes a first arm (arm) 130 supported so as to be rotatable about a horizontal second axis B with respect to the turning drum 120, and an upper movable part (not shown) supported at the distal end of the first arm 130.

Figure 2:
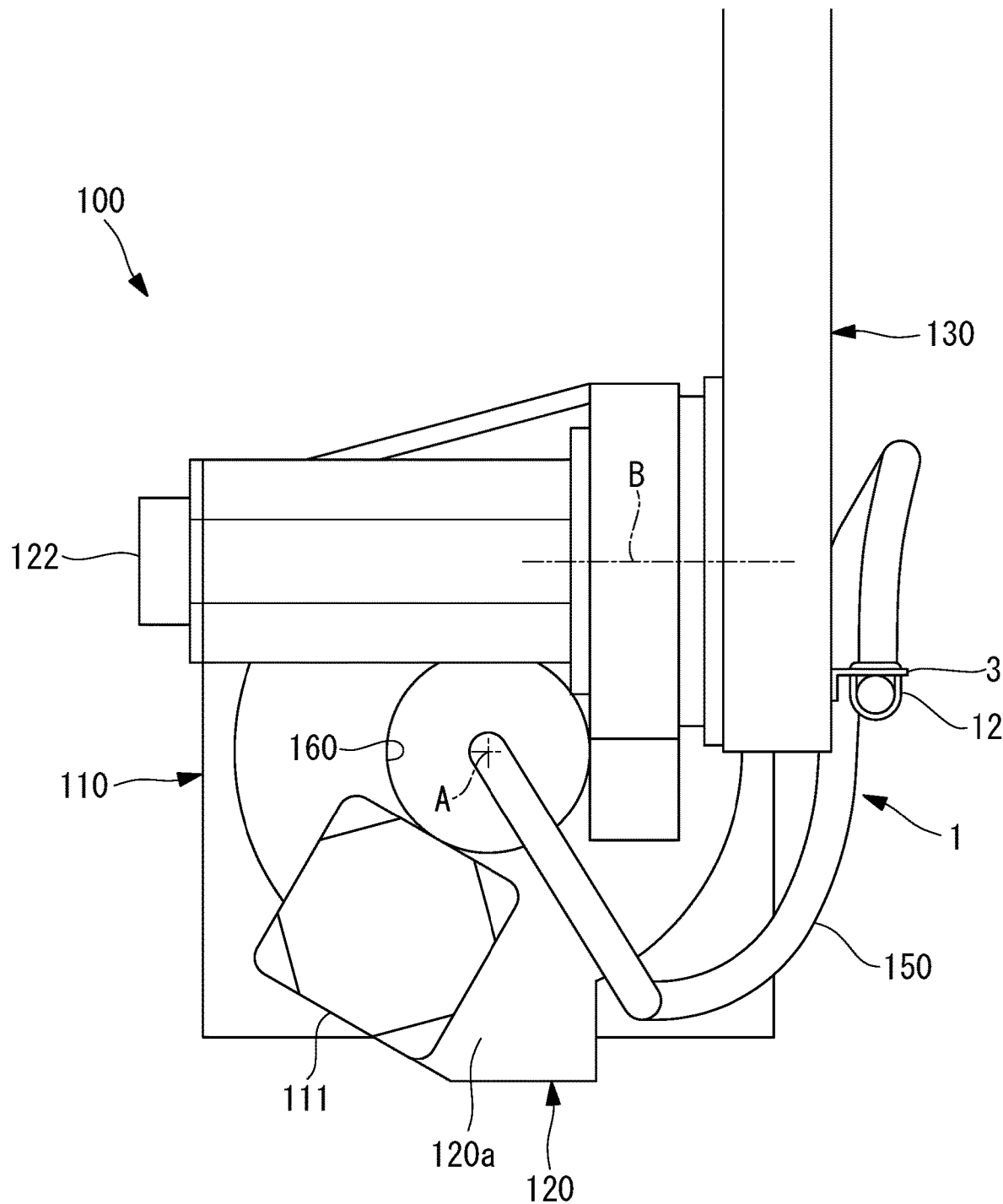
FIG. 2 is a partial plan view of the robot showing the cable-assembly management structure in FIG. 1.
Figure 3:
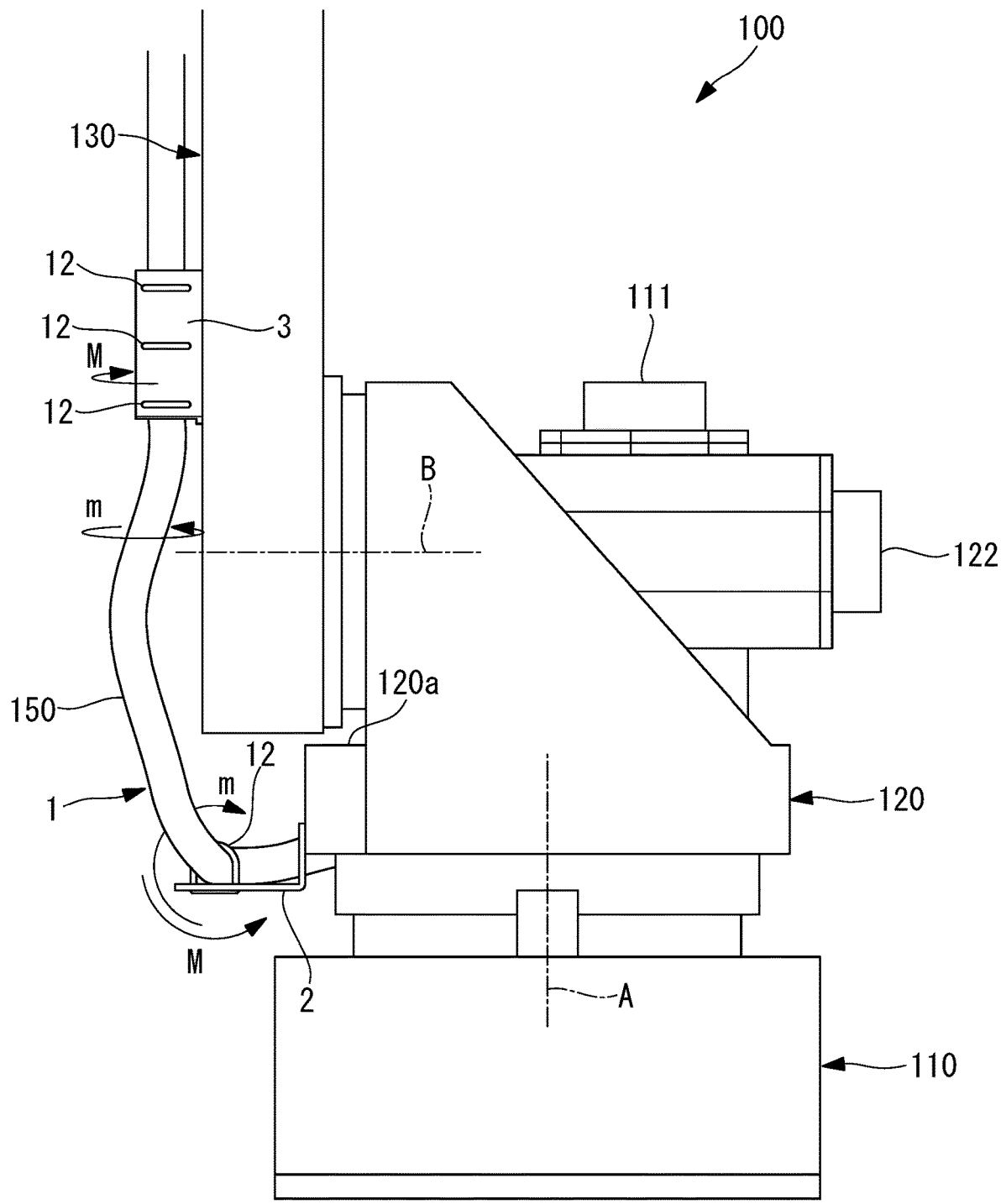
FIG. 3 is a partial front view of the robot showing the cable-assembly management structure in FIG. 1.

As shown in FIGS. 2 and 3, the first arm 130 is disposed on the turning drum 120, at a position offset from the first axis A in one direction along the second axis B.

The upper movable part includes a second arm, which has a longitudinal axis and is supported at the distal end of the first arm 130 so as to be rotatable about a third axis parallel to the second axis B, and a wrist unit supported at the distal end of the second arm.

As shown in FIG. 2, a motor 111, which rotates the turning drum 120 with respect to the base 110, is fixed to a top surface 120a of the turning drum 120.

A motor 122, which rotates the first arm 130 with respect to the turning drum 120, is fixed to the turning drum 120.

A motor that rotates the second arm with respect to the first arm 130 is fixed to the second arm. Three motors (not shown) that drive the wrist unit are accommodated in the second arm and a first wrist element.

The robot 100 includes a basic cable (a cable assembly; hereinbelow, a first cable assembly) 150 for transmitting power and control signals to the motors 111 and 122.

The cable-assembly management structure 1 according to this embodiment is a management structure for the first cable assembly 150.

As shown in FIG. 1, one end of the first cable assembly 150 is connected, via a connector 113, to a wiring PCB 112 provided on the back of the base 110.

The first cable assembly 150 extends upward from the inside of the base 110, through the base 110 and a hollow part 160 vertically penetrating through the turning drum 120 at a portion near the first axis A, and is led out upward from the opening of the hollow part 160 in the top surface 120a of the turning drum 120.

In the first cable assembly 150, a cable for the motor 111 for driving the turning drum 120 and a cable for the motor 122 for driving the first arm 130 with respect to the turning drum 120 are diverged from the other first cable assembly 150 and are connected to the motors 111 and 122, respectively.

As shown in FIGS. 1 and 2, the remaining first cable assembly 150 led out above the turning drum 120 is bent toward the back of the turning drum 120 from the position where it is led out above the turning drum 120 and is guided toward a position below the top surface 120a of the turning drum 120.

Then, the first cable assembly 150 is bent around the side of the turning drum 120 at a height below the top surface 120a and is guided below the first arm 130. The first cable assembly 150 is attached to the turning drum 120 with a first fixing member 2 so as to extend straight horizontally in the front-rear direction of the robot 100, at a position below the first arm 130.

The first fixing member 2 is fixed to the turning drum 120 with a bolt (not shown) and fixes the first cable assembly 150 to the turning drum 120 by fastening the first cable assembly 150 with binding bands 12 in a state in which the first cable assembly 150 is fitted to the first fixing member 2.

As shown in FIG. 1, the first cable assembly 150 is bent upward at a front-side position relative to the first fixing member 2. As a result, the first cable assembly 150 is guided to the first arm 130 and is fixed to a side surface of the first arm 130 with a second fixing member 3 and binding bands 12, at a position closer to the distal end of the first arm 130 than the second axis B is.

The portion of the first cable assembly 150 located between the first fixing member 2 and the second fixing member 3 is a movable portion that can move when the first arm 130 swings about the second axis B with respect to the turning drum 120.

In this embodiment, the movable portion of the first cable assembly 150 is provided with a necessary length of allowance for the operation of the first arm 130 and is twisted by a predetermined amount.

Because the movable portion of the first cable assembly 150 is fixed with a certain length of allowance, the first cable assembly 150 is not excessively bent by repeated operation of the first arm 130 and has sufficient durability. Furthermore, because the movable portion of the first cable assembly 150 is twisted, the movable portion moves as follows.

Specifically, as shown in FIG. 3, by applying, to the first fixing member 2 and the second fixing member 3, twist moments M in opposite directions about the longitudinal axis of the first cable assembly 150, the movable portion is twisted in one direction. In this embodiment, a counterclockwise twist moment M, as viewed from the front, is applied to the first fixing member 2, and a clockwise twist moment M, as viewed from the distal end of the first arm 130, is applied to the second fixing member 3.

As a result, in the movable portion, twist moments m caused by the elastic recovery force of the movable portion, i.e., a clockwise twist moment m, as viewed from the front, is applied to a portion near the first fixing member 2, and a counterclockwise twist moment m, as viewed from the distal end of the first arm 130, is applied to a portion near the second fixing member 3.

Figure 4:
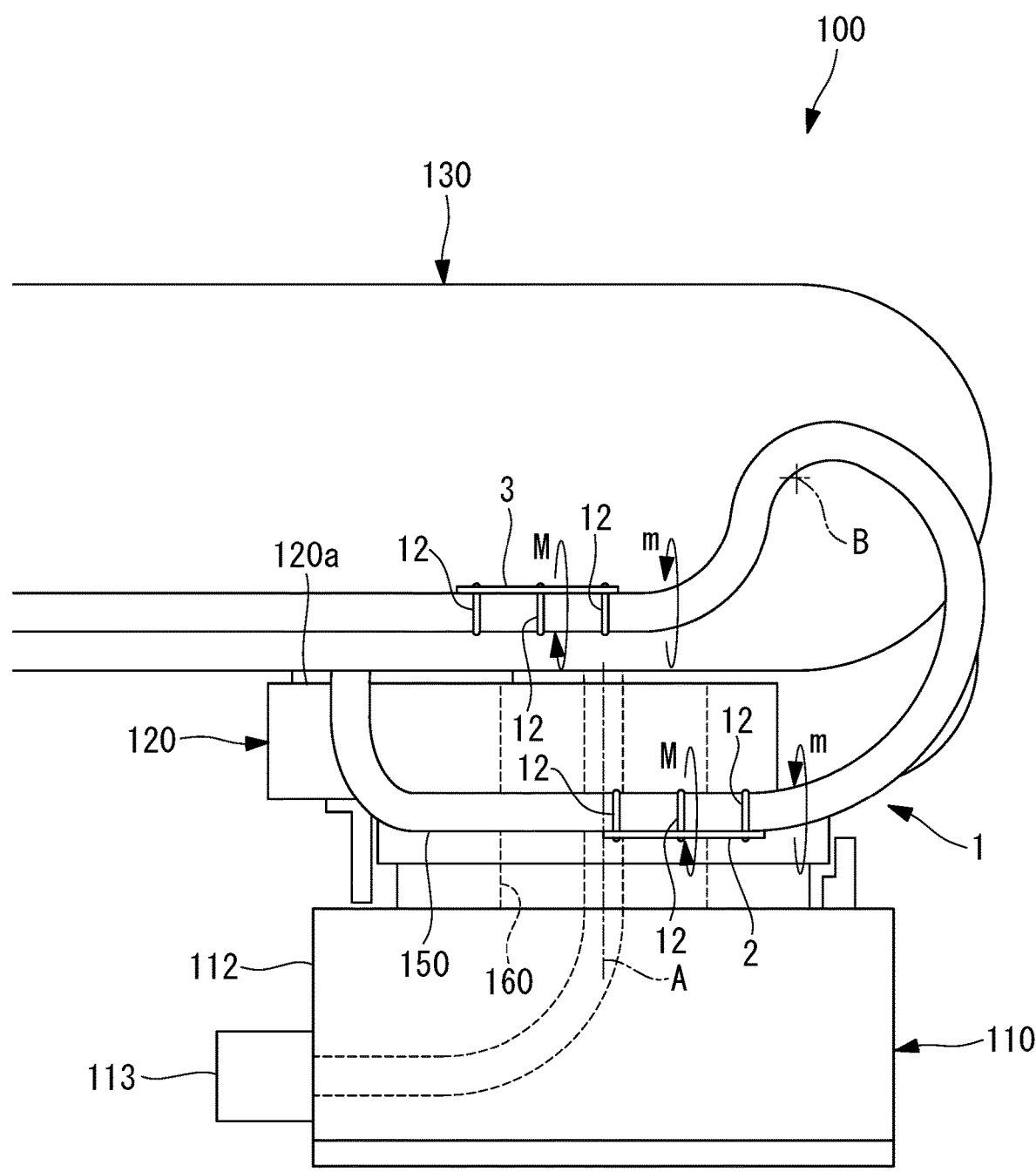
FIG. 4 is a partial side view of the robot showing a state in which a first arm has swung to a rear swing end in the cable-assembly management structure in FIG. 1.
Figure 5:
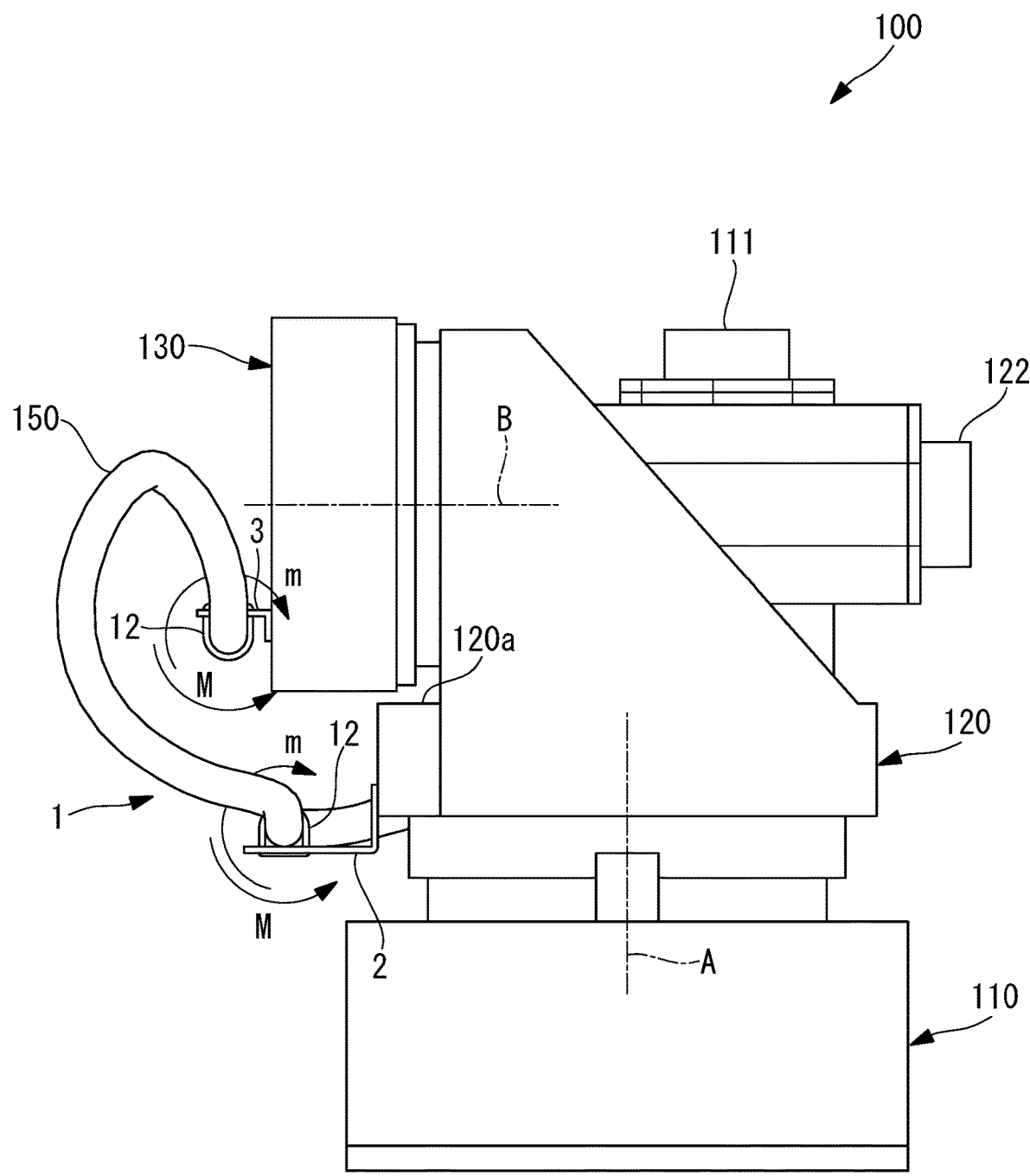
FIG. 5 is a partial front view of the robot showing the cable-assembly management structure in FIG. 4.
Figure 6:
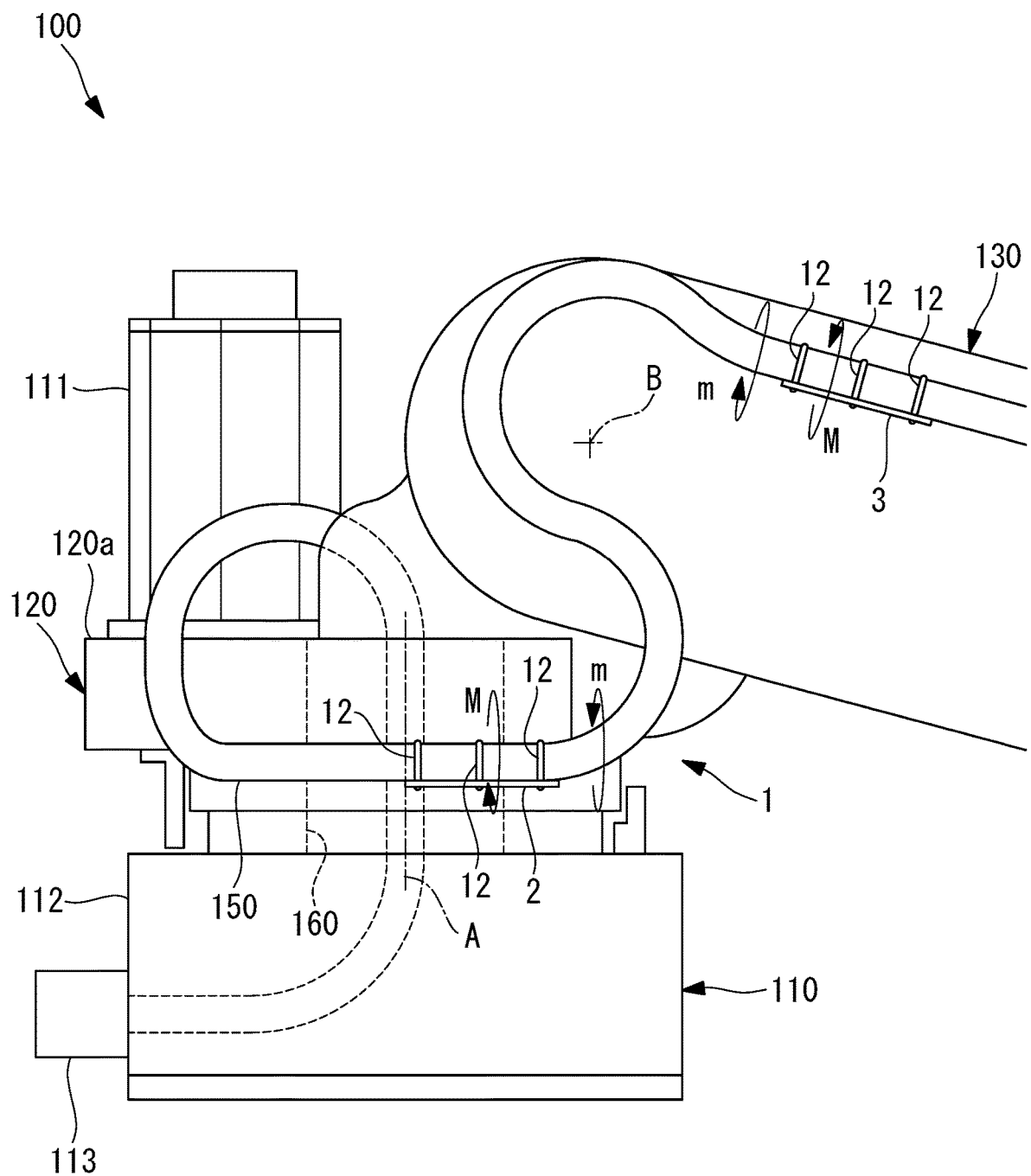
FIG. 6 is a partial side view of the robot showing a state in which the first arm has swung to a front swing end in the cable-assembly management structure in FIG. 1.
Figure 7:
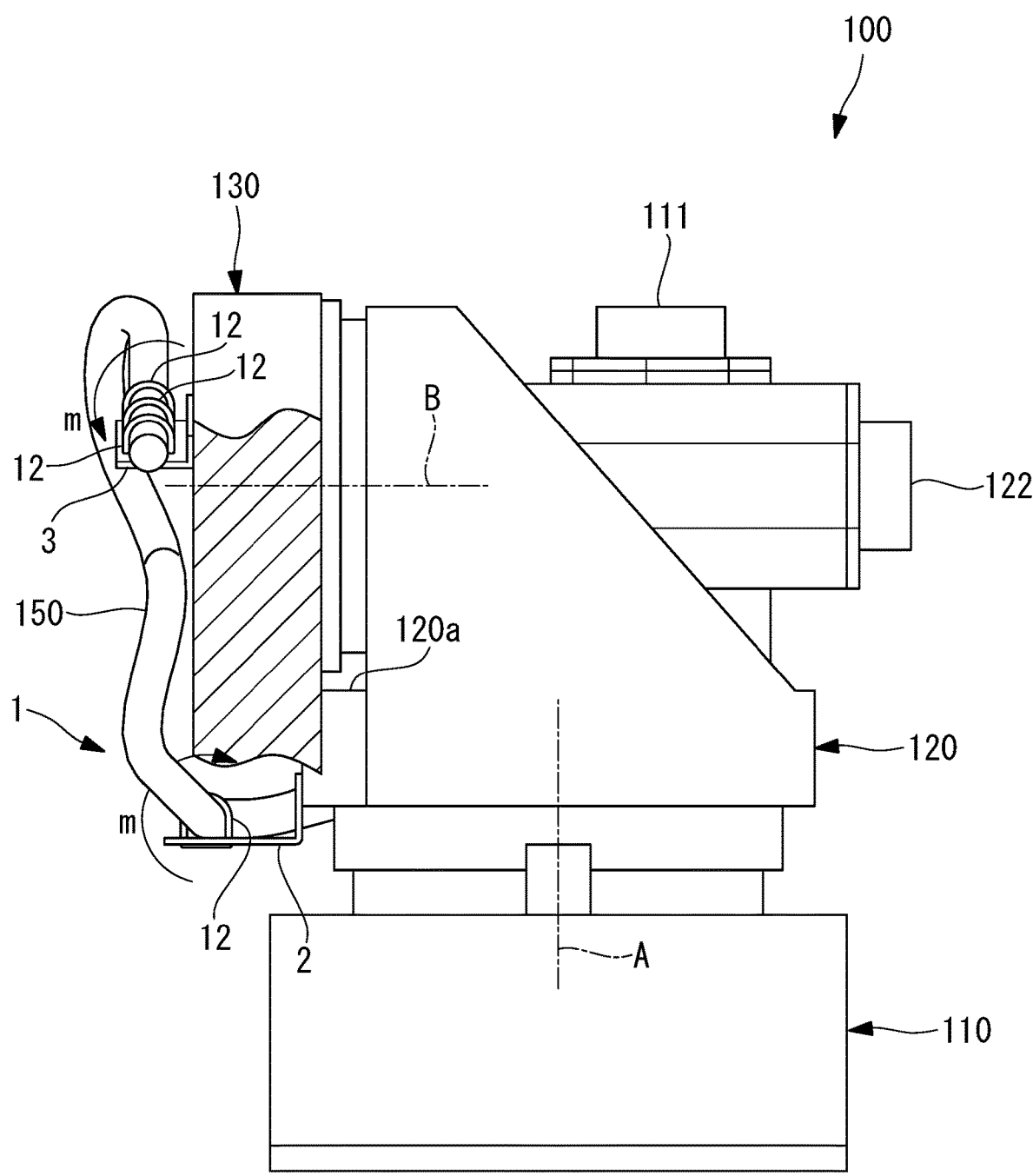
FIG. 7 is a partial front view of the robot showing the cable-assembly management structure in FIG. 6.

The orientation of the second fixing member 3 when the first arm 130 has swung to the rear swing end, as shown in FIGS. 4 and 5, and the orientation when the first arm 130 has swung to the front swing end, as shown in FIGS. 6 and 7, are reversed. As a result, when the first arm 130 has swung to the rear swing end, as shown in FIGS. 4 and 5, the movable portion is displaced away from the side surface of the first arm 130 due to the twist moment m caused by the elastic recovery force.

Meanwhile, when the first arm 130 has swung to the front swing end, as shown in FIGS. 6 and 7, the movable portion is displaced toward the side surface of the first arm 130 due to the twist moment m caused by the elastic recovery force.

While the first arm 130 swings from the rear swing end, shown in FIGS. 4 and 5, toward the front swing end, shown in FIGS. 6 and 7, the movable portion is displaced substantially in one direction from a position away from the side surface of the first arm 130 toward a position close to the side surface.

The cable-assembly management structure 1 according to this embodiment has the following advantages.

Specifically, a retrofittable cable assembly (hereinbelow, a second cable assembly) 170, which is different from the basic cable 150, is attached to the robot 100.

The second cable assembly 170 is, for example, at least one cable or tube for supplying power, control signals, compressed air, refrigerant, or the like to a tool (not shown) attached to the distal end of the wrist unit and is fitted to the robot 100 by a user.

As shown in FIGS. 8 to 12, the second cable assembly 170 extends from the base 110 and is wired parallel to the first cable assembly 150. In this case, with the cable-assembly management structure 1 according to this embodiment, regarding the first cable assembly 150, while the first arm 130 operates in the overall operation area, the movable portion of the first cable assembly 150 is displaced in one direction from a state in which it is away from the side surface of the first arm 130 to a state in which it is close to the side surface of the first arm 130.

The second cable assembly 170 is displaced in the direction opposite to the direction in which the first cable assembly 150 is displaced. Specifically, while the movable portion of the first cable assembly 150 is displaced from a position near the side surface of the first arm 130 to a position away from the side surface of the first arm 130 as the first arm 130 swings, the movable portion of the second cable assembly 170 is displaced from a position away from the side surface of the first arm 130 to a position close to the side surface of the first arm 130.

The first cable assembly 150 and the second cable assembly 170 are wired such that the movable portion of the first cable assembly 150 and the movable portion of the second cable assembly 170 do not pass through the same position in a plane perpendicular to the second axis B when the positions of the movable portion of the first cable assembly 150 and the movable portion of the second cable assembly 170 are changed.

With this configuration, contact between the first cable assembly 150 and the second cable assembly 170 is avoided. Specifically, there is an advantage in that, even when the two cable assemblies 150 and 170 are wired in parallel, it is possible to prevent the cable assemblies 150 and 170 from rubbing against each other and, thus, to prevent a reduction in the life of the cable assemblies 150 and 170.

Figure 8:
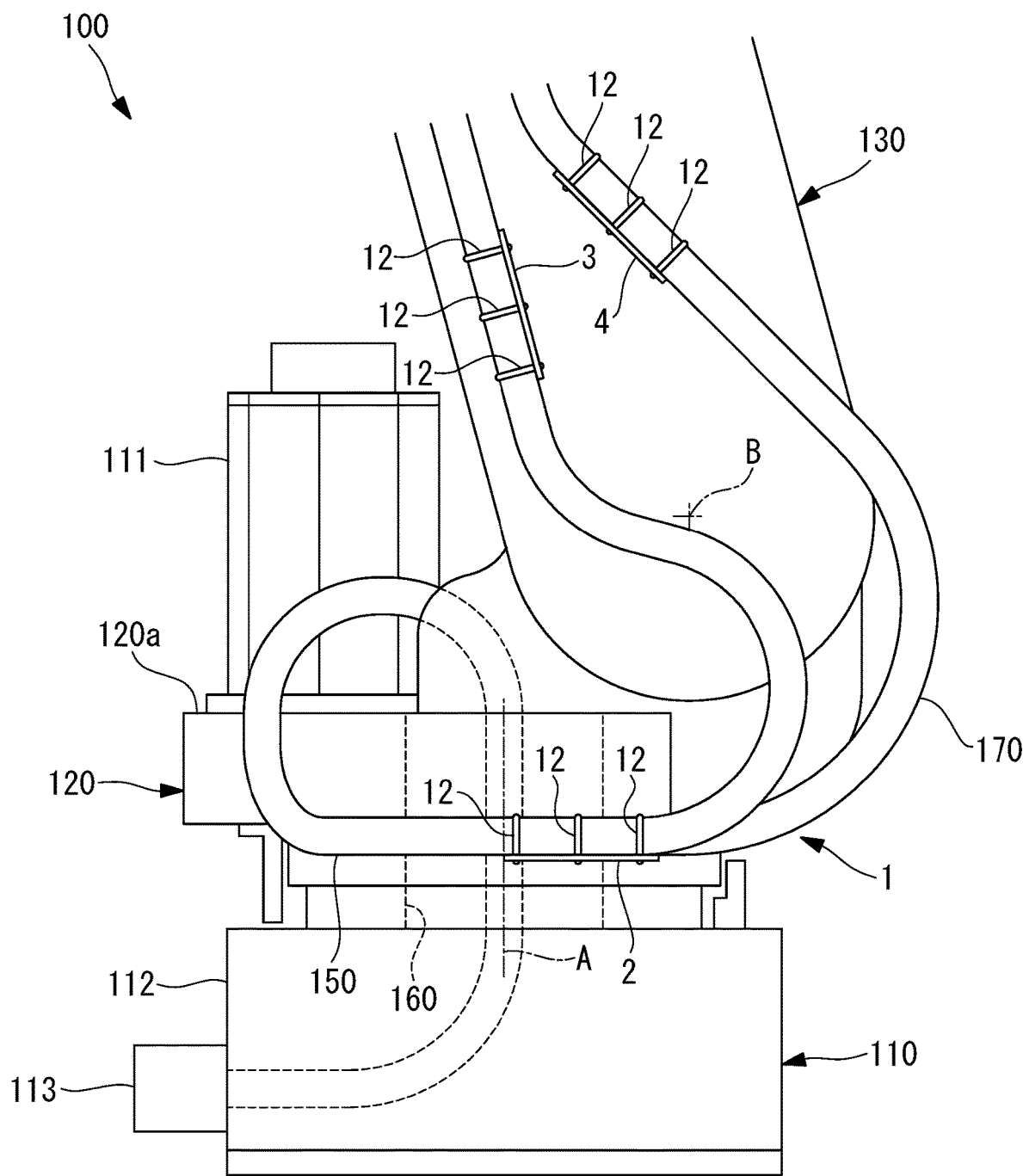
FIG. 8 is a partial side view of the robot showing a state in which a retrofittable cable assembly is fitted in the cable-assembly management structure of the robot in FIG. 1.

To wire the movable portion of the second cable assembly 170 such that it is displaced in the direction opposite to the direction in which the movable portion of the first cable assembly 150 is displaced, as shown in FIG. 8, the second cable assembly 170 is not twisted, but the angle of a third fixing member 4 for fixing the second cable assembly 170 to the first arm 130 is adjusted. In the example shown in FIG. 8, the third fixing member 4 is inclined with respect to the longitudinal axis of the first arm 130 such that one end (distal end) of the third fixing member 4 closer to the distal end of the second cable assembly 170 is closer to the rear side of the first arm 130 than the other end (base end) thereof is.

Figure 9:
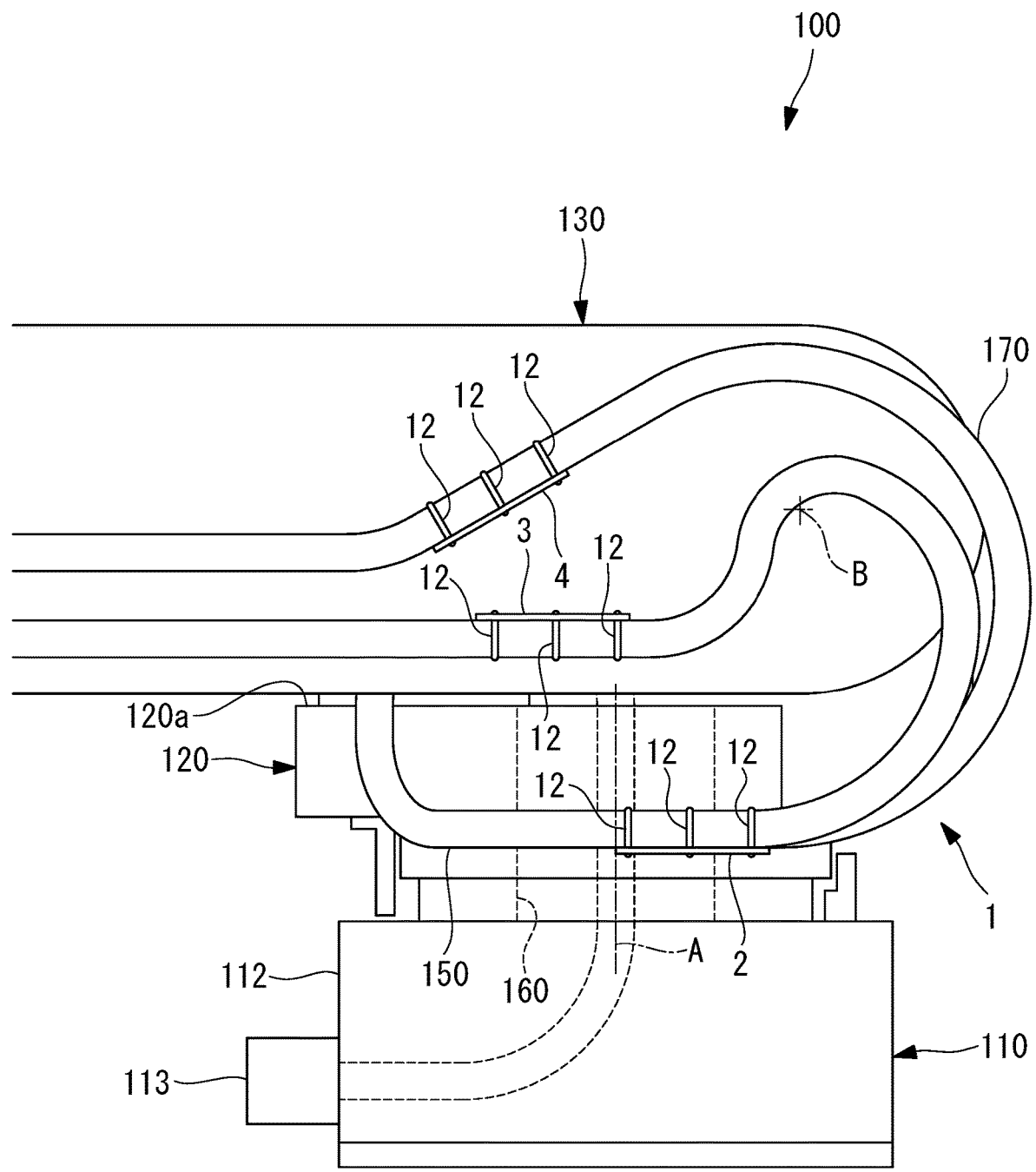
FIG. 9 is a partial side view of the robot showing a state in which the first arm has swung to the rear swing end in the cable-assembly management structure in FIG. 8.
Figure 10:
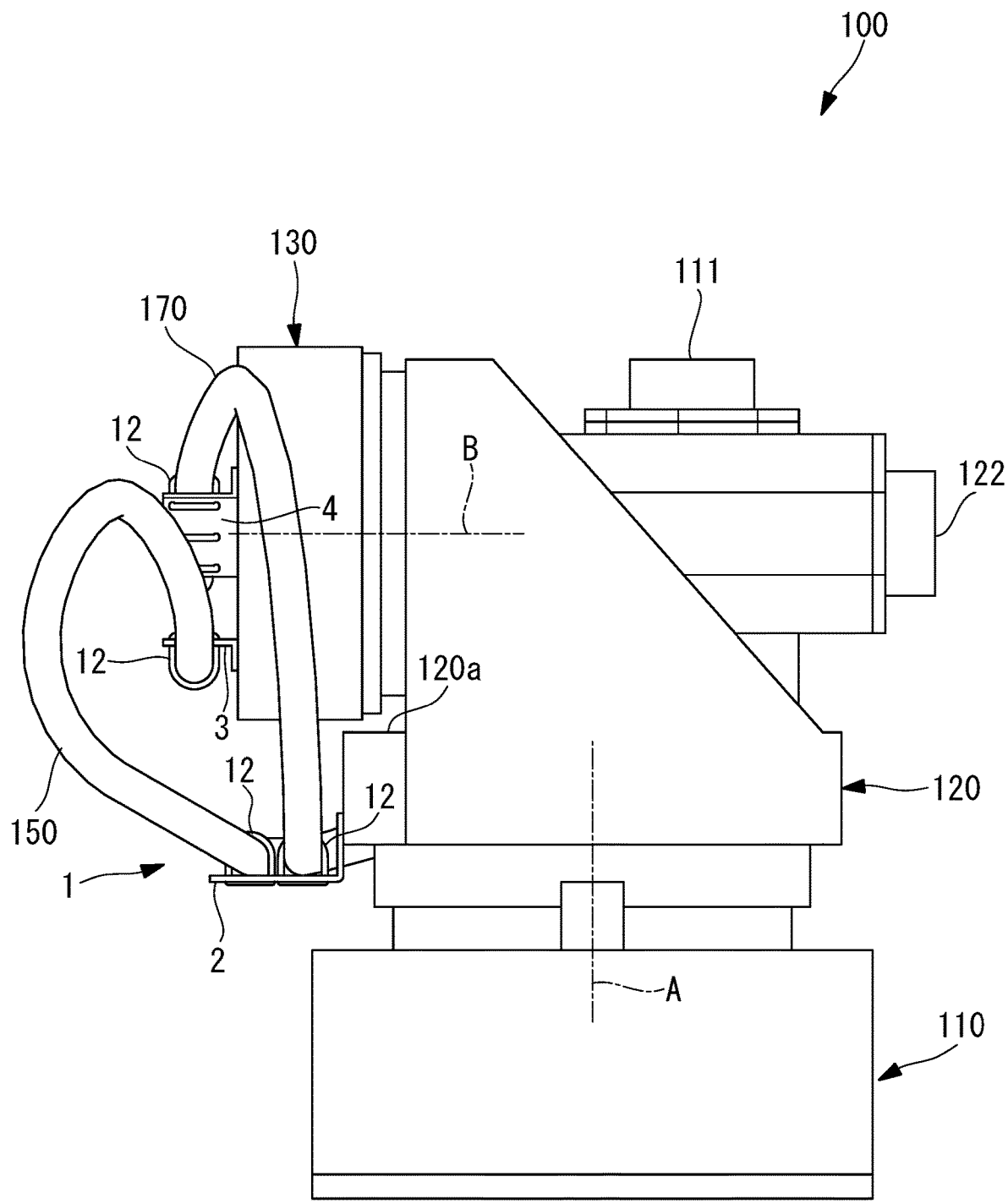
FIG. 10 is a partial front view of the robot showing the cable-assembly management structure in FIG. 9.

With this configuration, as shown in FIGS. 9 and 10, the movable portion of the second cable assembly 170 is bent loosely with a large radius of curvature when the first arm 130 swings about the second axis B to the rear swing end with respect to the turning drum 120. As a result, the movable portion of the second cable assembly 170 is bent at a position near the side surface of the first arm 130.

Figure 11:
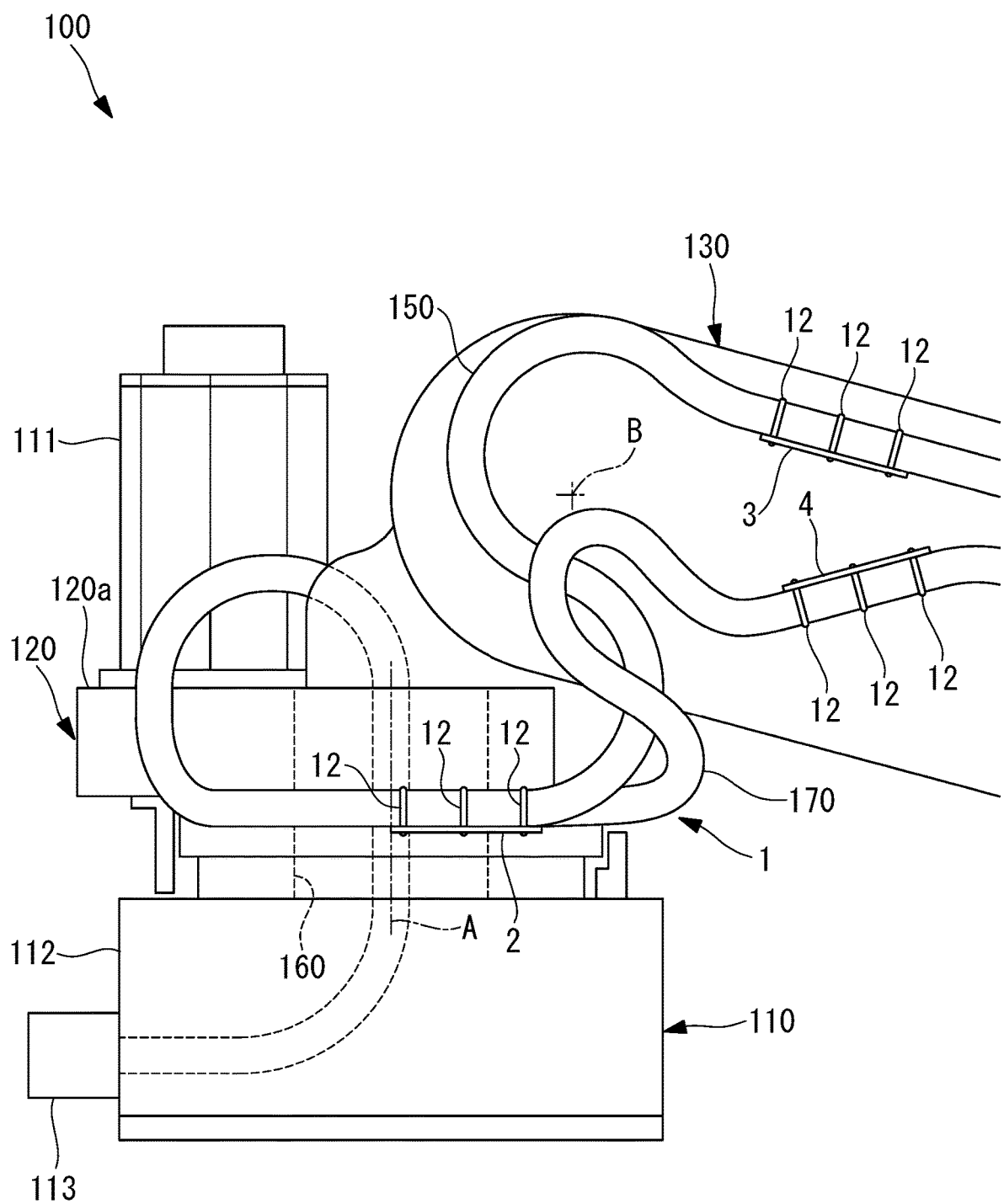
FIG. 11 is a partial side view of the robot showing a state in which the first arm has swung to the front swing end in the cable-assembly management structure in FIG. 8.
Figure 12:
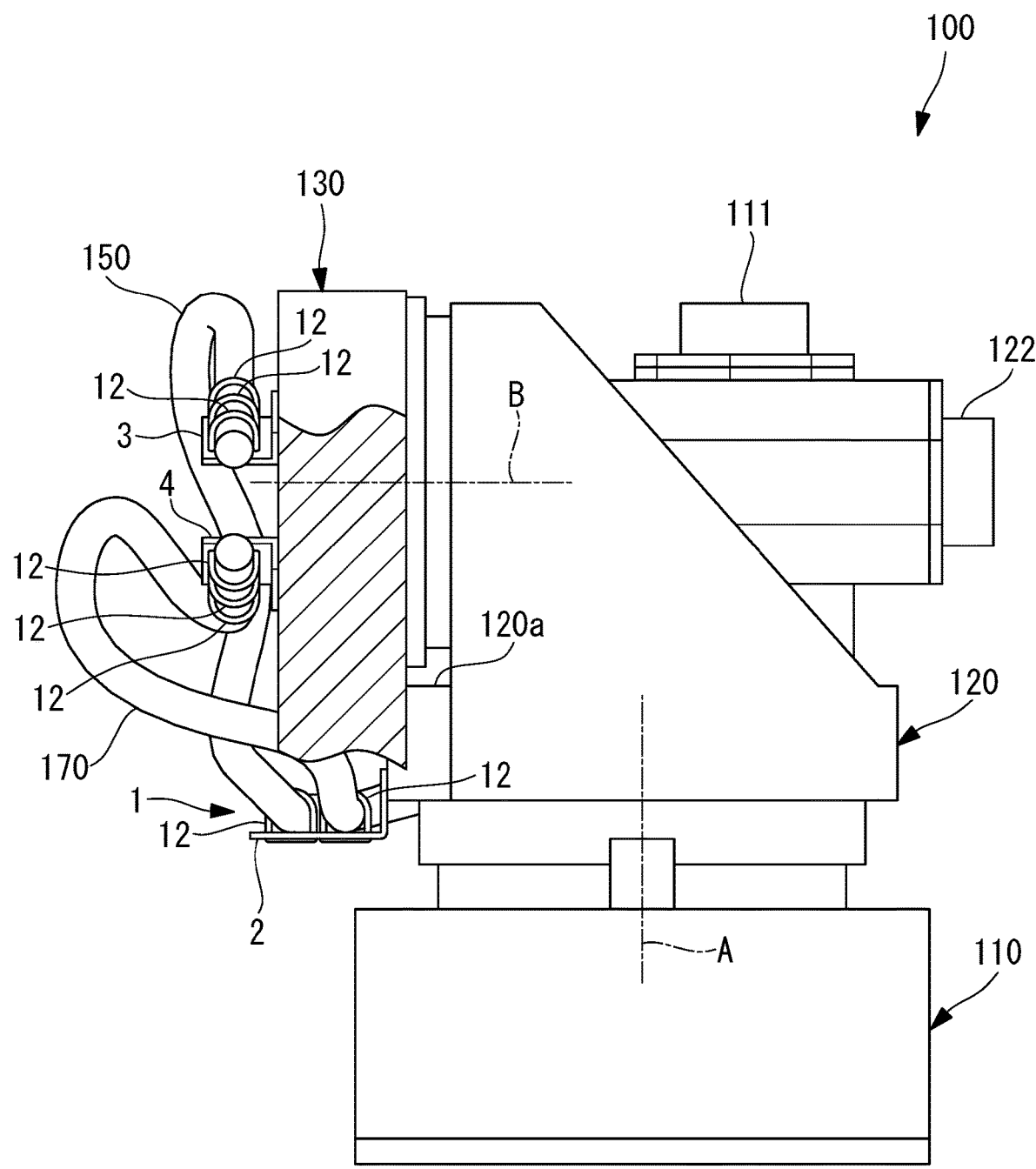
FIG. 12 is a partial front view of the robot showing the cable-assembly management structure in FIG. 11.

Meanwhile, when the first arm 130 swings about the second axis B to the front swing end with respect to the turning drum 120, as shown in FIGS. 11 and 12, the movable portion of the second cable assembly 170 is bent relatively tightly and is bent in a direction away from the side surface of the first arm 130. In this way, it is possible to displace the second cable assembly 170 in the direction opposite to the direction in which the first cable assembly 150, serving as the basic cable, is displaced.

Furthermore, with the cable-assembly management structure 1 according to this embodiment, the first cable assembly 150 is fixed, with the first fixing member 2, to the turning drum 120 so as to extend straight in the front-rear direction of the robot 100, parallel to the installation surface. This prevents the first cable assembly 150 from projecting largely outward in the radial direction centered on the first axis A, and thus, it is possible to reduce the possibility of the first cable assembly 150 interfering with the surrounding members during rotation of the turning drum 120.

Furthermore, because the first cable assembly 150 is fixed, with the first fixing member 2, to the turning drum 120 so as to extend straight in the front-rear direction of the robot 100, parallel to the installation surface, the second axis B can be set at a low position. This reduces the overall height of the robot 100, which is another advantage.

In this embodiment, the cable-assembly management structure 1 in which the first cable assembly 150 alone is wired has been described as an example. As described above, the cable-assembly management structure 1 has an advantage in that, by wiring the second cable assembly 170 with the above-described wiring method, it is possible to avoid contact between two cable assemblies 150 and 170 due to swinging of the first arm 130.

Instead of the above-described method, as shown in FIGS. 13 to 17, the first cable assembly 150 may be wired with the above-described wiring method for the second cable assembly 170.

Figure 13:
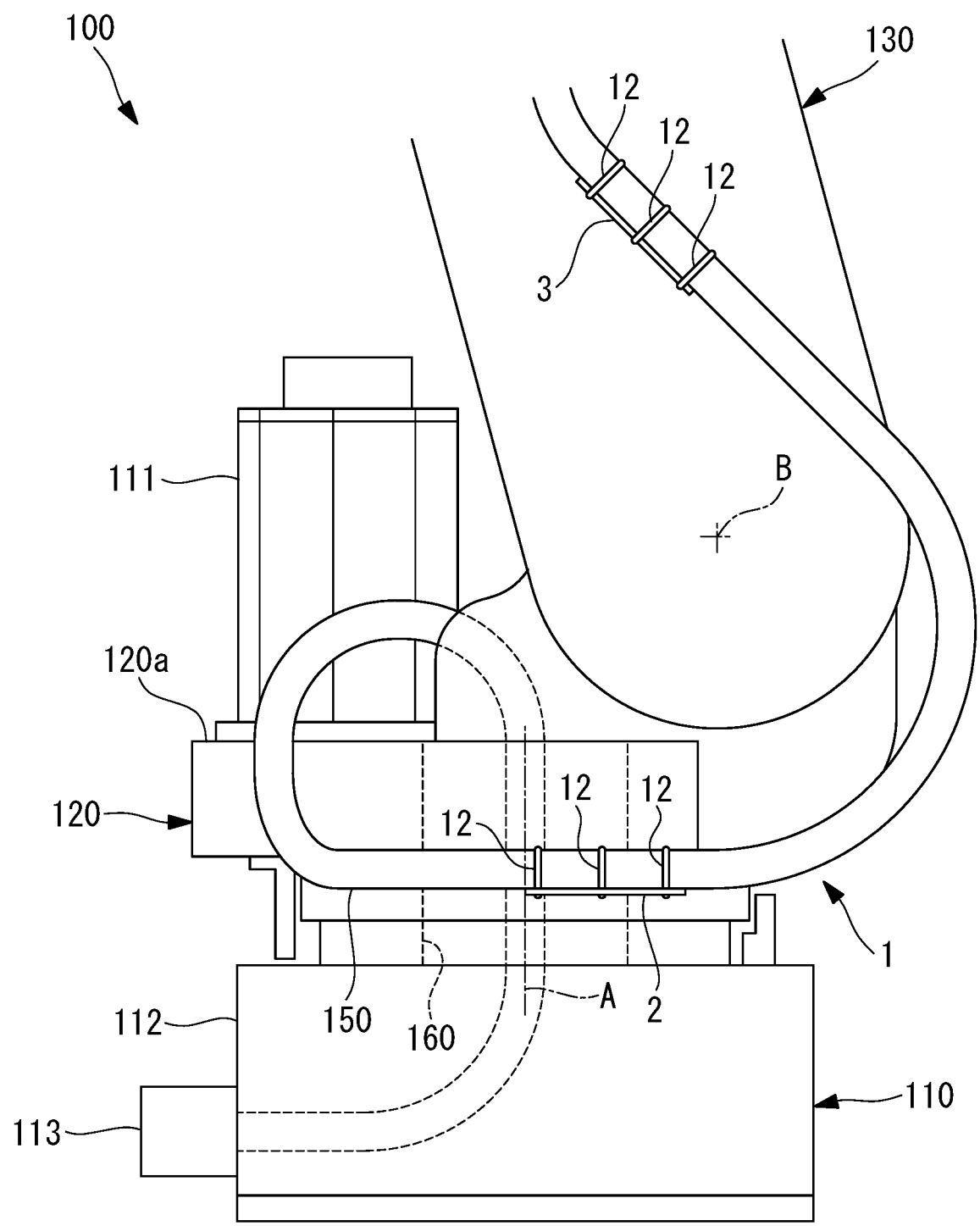
FIG. 13 is a partial side view of the robot showing a modification of the robot cable-assembly management structure in FIG. 1.

Specifically, as shown in FIG. 13, the first cable assembly 150 fixed to the turning drum 120 with the first fixing member 2 is bent upward at a front side relative to the first fixing member 2. As a result, the first cable assembly 150 is guided along the first arm 130 and is fixed, with the second fixing member 3 and the binding bands 12, to the side surface of the first arm 130 at a position closer to the distal end of the first arm 130 than the fixed second axis B is.

Figure 14:
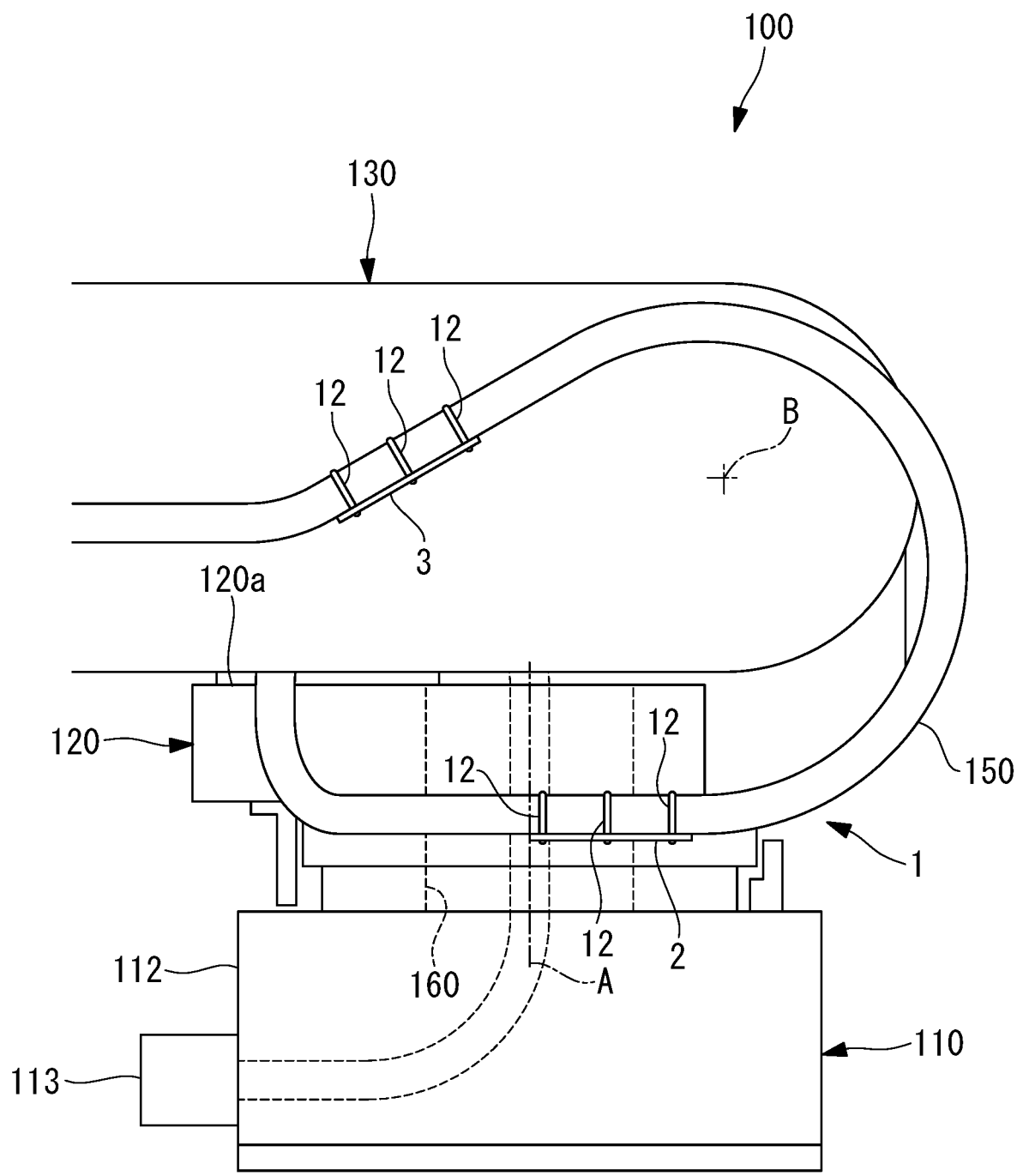
FIG. 14 is a partial side view of the robot showing a state in which the first arm has swung to the rear swing end in the cable-assembly management structure in FIG. 13.
Figure 15:
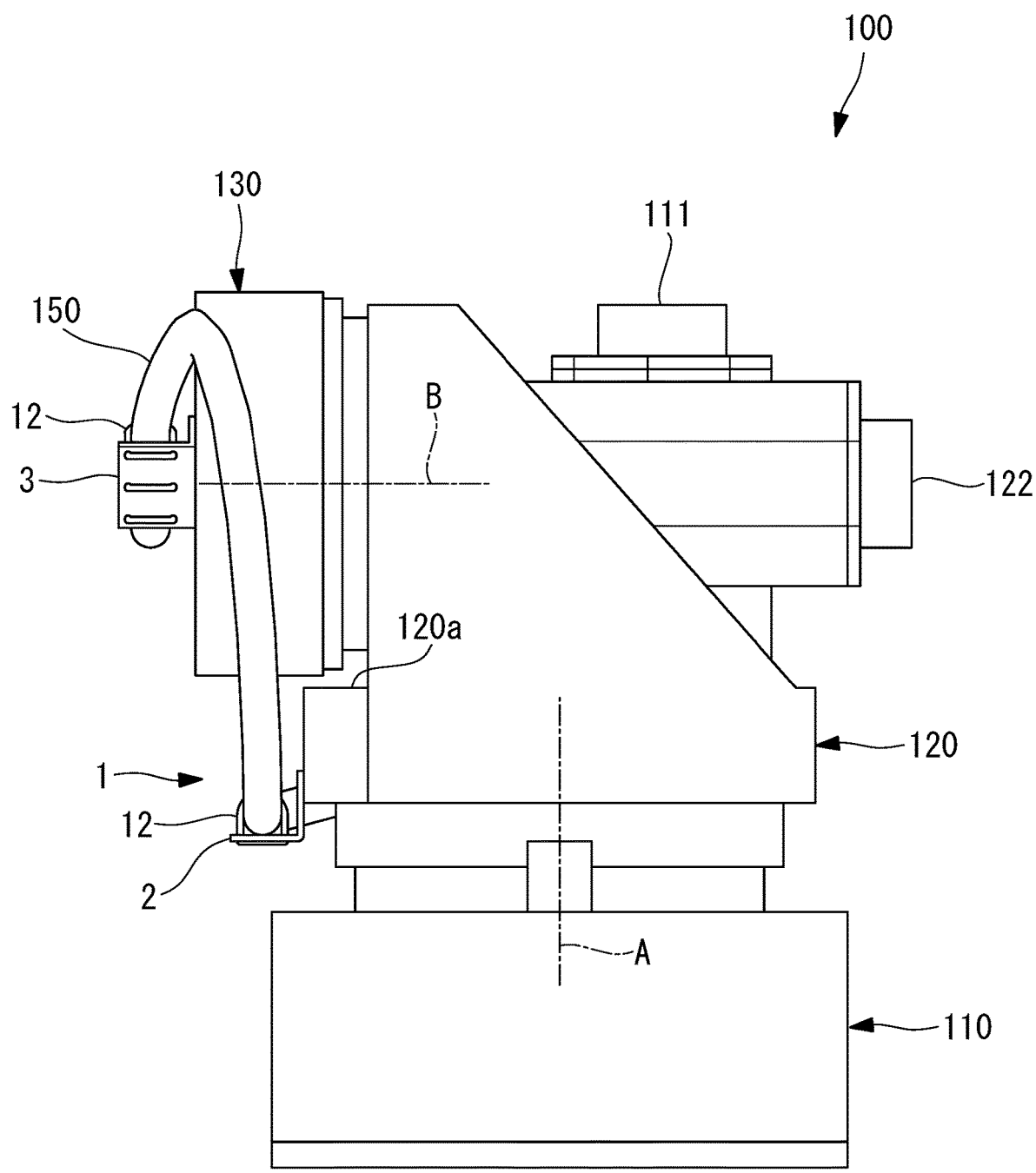
FIG. 15 is a partial front view of the robot showing the cable-assembly management structure in FIG. 14.

At this time, as shown in FIG. 13, the second fixing member 3 is attached to the side surface of the first arm 130 so as to be inclined with respect to the longitudinal axis of the first arm 130 such that the distal end thereof is closer to the rear side of the first arm 130 than the base end thereof is. This allows the movable portion of the first cable assembly 150 to be loosely bent with a large radius of curvature when the first arm 130 swings about the second axis B to the rear swing end with respect to the turning drum 120, as shown in FIGS. 14 and 15.

Accordingly, in the orientation in which the first arm 130 has swung to the rear swing end, it is possible to bend the movable portion of the first cable assembly 150 at a position near the side surface of the first arm 130.

Figure 16:
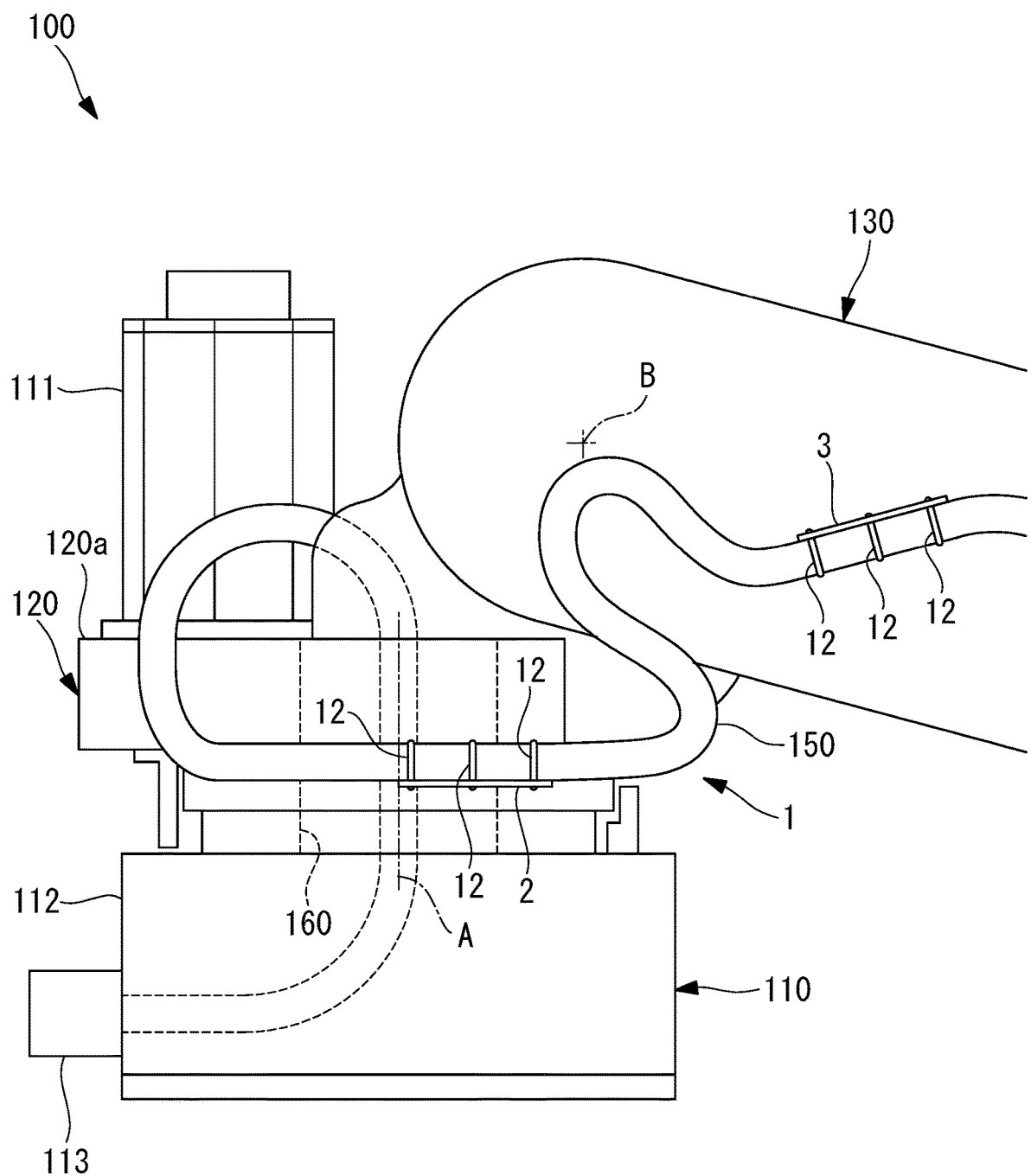
FIG. 16 is a partial side view of the robot showing a state in which the first arm has swung to the front swing end in the cable-assembly management structure in FIG. 13.
Figure 17:
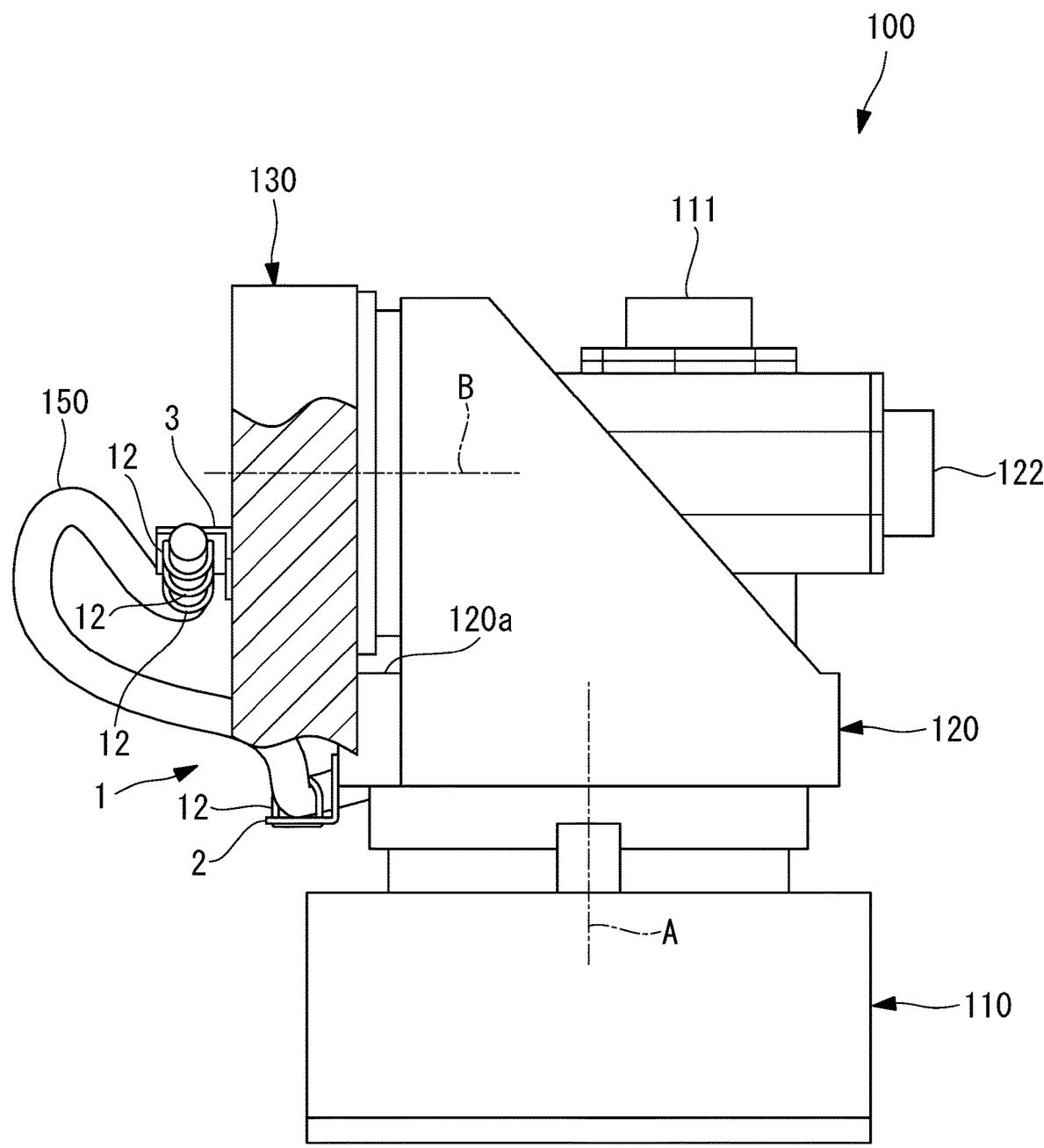
FIG. 17 is a partial front view of the robot showing the cable-assembly management structure in FIG. 16.

Meanwhile, as shown in FIGS. 16 and 17, when the first arm 130 swings about the second axis B to the front swing end with respect to the turning drum 120, the movable portion of the first cable assembly 150 is relatively tightly bent and is bent in a direction away from the side surface of the first arm 130.

With the thus-configured cable-assembly management structure 1, by wiring the second cable assembly 170 with the above-described wiring method for the first cable assembly 150, it is possible to switch the first cable assembly 150 and the second cable assembly 170 and to achieve the same advantage as above.

Furthermore, in this embodiment, as shown in FIGS. 8 to 12, it is possible to employ a cable-assembly management structure 1 to which the two cable assemblies 150 and 170 are preliminarily attached.

Furthermore, in the above-described embodiment, although a twist moment in one direction is applied to the movable portion of the first cable assembly 150, when the first arm 130 is offset to the opposite side of the center of the turning drum 120, a twist moment in the opposite direction is applied.

The invention claimed is:

1. A robot cable-assembly management structure for a robot including a base to be installed on an installation surface, a turning drum supported so as to be rotatable about a vertical first axis with respect to the base, and an arm supported so as to be swingable about a horizontal second axis with respect to the turning drum, the cable-assembly management structure wiring a cable assembly from the turning drum to the arm, the cable-assembly management structure comprising:
    a first fixing member that fixes, to the turning drum, a first intermediate portion of the cable assembly extending beside the turning drum in a front-rear direction of the turning drum, at a position between the base and a base end of the arm; and
    a second fixing member that fixes, to a side surface of the arm, a second intermediate portion of the cable assembly extending to a front side of the first fixing member, at a position closer to a distal end of the arm than the second axis, wherein
    a movable portion of the cable assembly located between the first fixing member and the second fixing member is provided with slack to allow for movement of the arm and is twisted in one direction, so that the movable portion is bent in a direction away from the side surface of the arm when the arm swings to a rear swing end and the movable portion is displaced toward the side surface of the arm as the arm swings toward a front swing end.

2. A robot cable-assembly management structure for a robot including a base to be installed on an installation surface, a turning drum supported so as to be rotatable about a vertical first axis with respect to the base, and an arm supported so as to be swingable about a horizontal second axis with respect to the turning drum, the cable-assembly management structure wiring a cable assembly from the turning drum to the arm, the cable-assembly management structure comprising:
    a first fixing member that fixes, to the turning drum, a first intermediate portion of the cable assembly extending beside the turning drum in a front-rear direction of the turning drum, at a position between the base and a base end of the arm; and
    a second fixing member that fixes, to a side surface of the arm, a second intermediate portion of the cable assembly extending to a front side of the first fixing member, at a position closer to a distal end of the arm than the second axis, wherein
    a movable portion of the cable assembly located between the first fixing member and the second fixing member is provided with slack to allow for movement of the arm, and the second fixing member is inclined toward a rear side of the arm with respect to the longitudinal-axis direction of the arm such that a portion of the second fixing member closer to a distal end of the arm is located closer to the rear side of the arm, so that the movable portion is located near the side surface of the arm when the arm swings to a rear swing end and the movable portion is bent in a direction away from the side surface of the arm as the arm swings toward a front swing end.

3. A robot cable-assembly management structure for a robot including a base to be installed on an installation surface, a turning drum supported so as to be rotatable about a vertical first axis with respect to the base, and an arm supported so as to be swingable about a horizontal second axis with respect to the turning drum, the cable-assembly management structure wiring a first cable assembly and a second cable assembly from the turning drum to the arm, the cable-assembly management structure comprising:
    a first fixing member that fixes, to the turning drum, a first intermediate portion of the first cable assembly and a first intermediate portion of the second cable assembly both extending in parallel, beside the turning drum in a front-rear direction of the turning drum, at a position between the base and a base end of the arm;
    a second fixing member that fixes, to a side surface of the arm, a second intermediate portion of the first cable assembly extending to a front side of the first fixing member, at a position closer to a distal end of the arm than the second axis; and
    a third fixing member that fixes, to the side surface of the arm, a third intermediate portion of the second cable assembly extending to the front side of the first fixing member, at a position closer to the distal end of the arm than the second axis, wherein
    a movable portion of the first cable assembly located between the first fixing member and the second fixing member is provided with slack to allow for movement of the arm and is twisted in one direction, a movable portion of the second cable assembly located between the first fixing member and the third fixing member is provided with slack to allow for movement of the arm, and the third fixing member is inclined toward a rear side of the arm with respect to the longitudinal-axis direction of the arm such that a portion of the third fixing member closer to a distal end of the arm is located closer to the rear side of the arm, so that the movable portion of the first cable assembly is bent in a direction away from the side surface of the arm and the movable portion of the second cable assembly is located near the side surface of the arm when the arm swings to a rear swing end, and then the movable portion of the first cable assembly is displaced toward the side surface of the arm and the movable portion of the second cable assembly is bent in a direction away from the side surface of the arm as the arm swings toward a front swing end.

* * * * *